E. J. BRACH.
CONFECTIONERY MACHINE.
APPLICATION FILED JAN. 18, 1916.
1,216,936.
Patented Feb. 20, 1917.
4 SHEETS—SHEET 1.
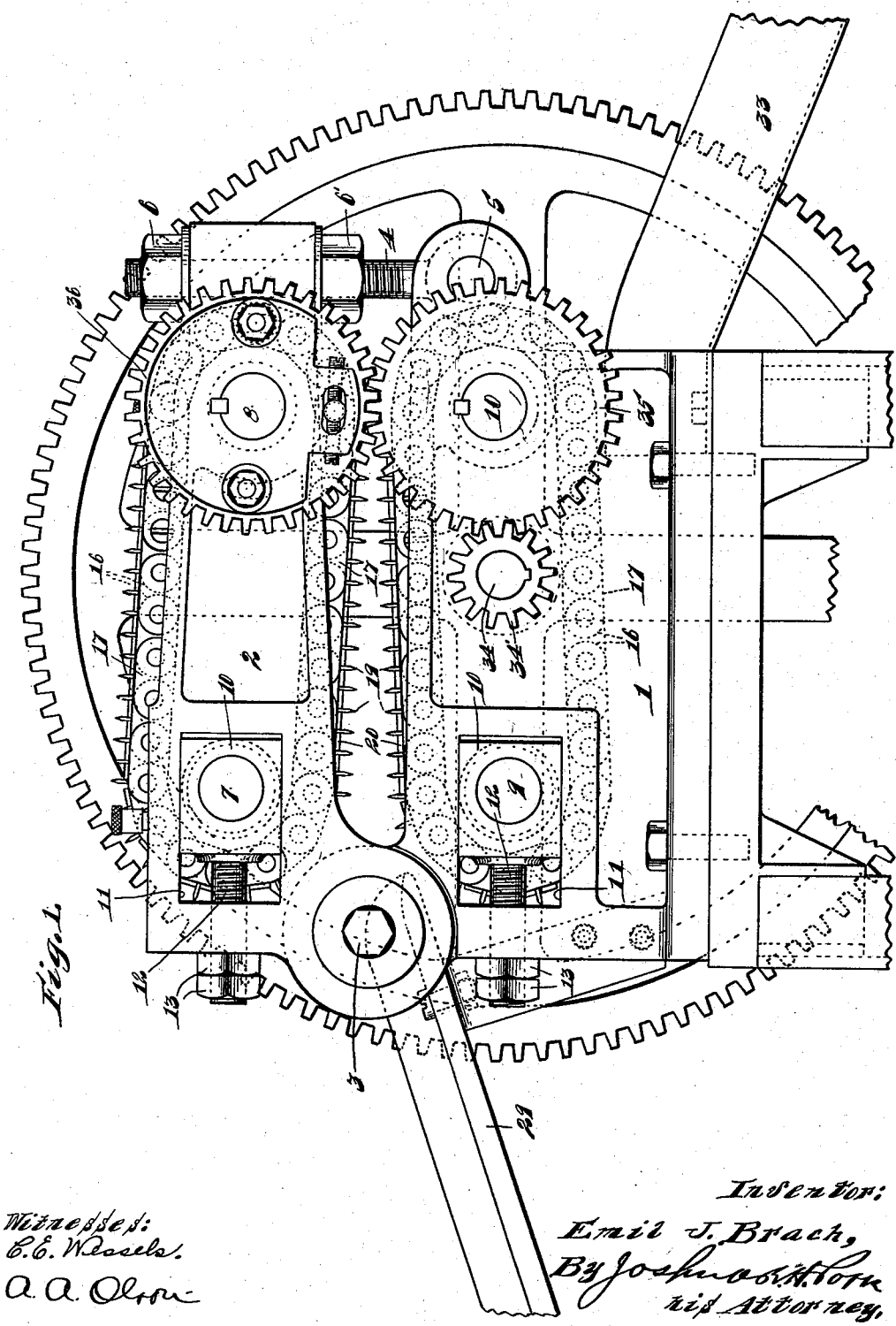

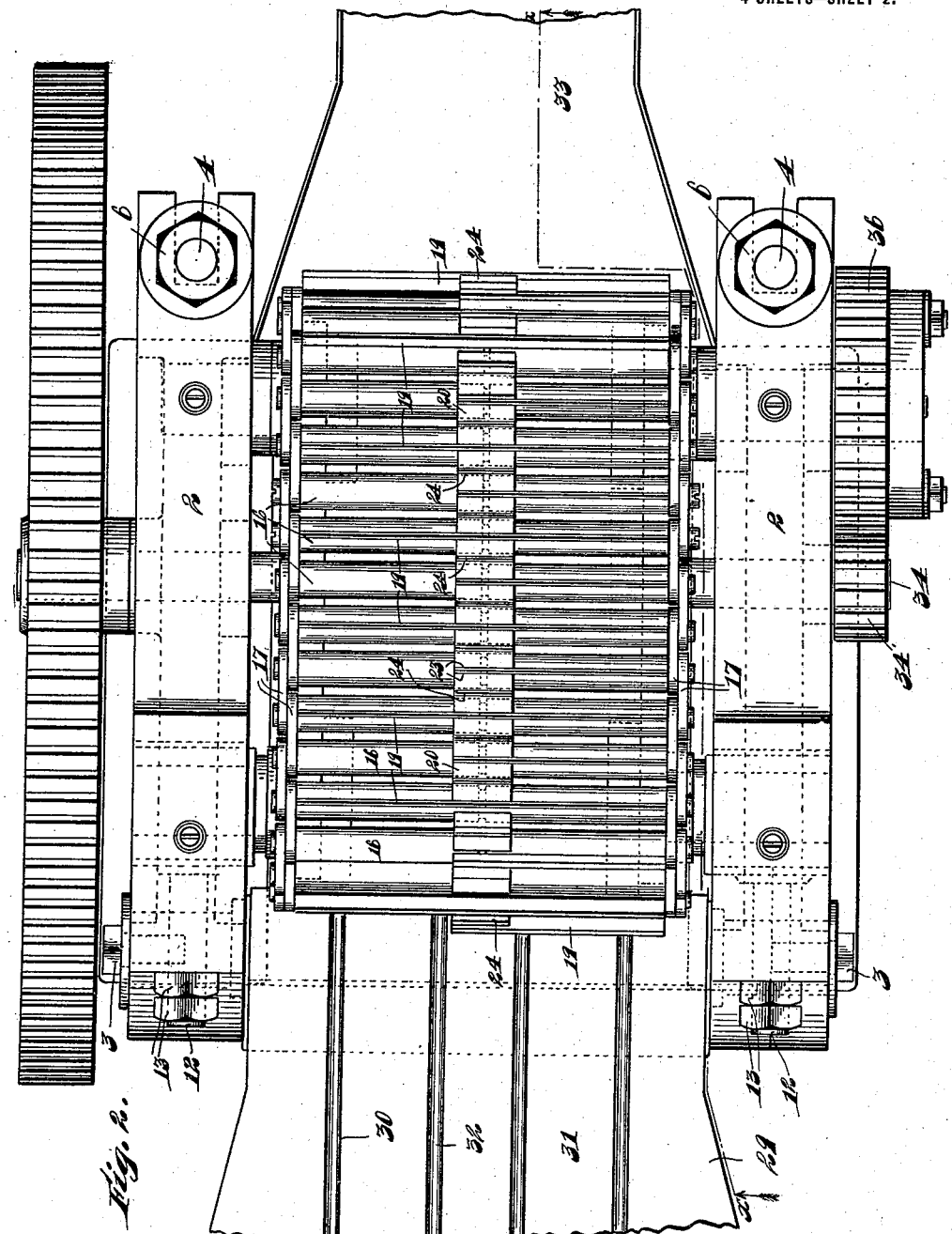

E. J. BRACH.
CONFECTIONERY MACHINE.
APPLICATION FILED JAN. 18, 1916.
1,216,936.
Patented Feb. 20, 1917.
4 SHEETS—SHEET 3.
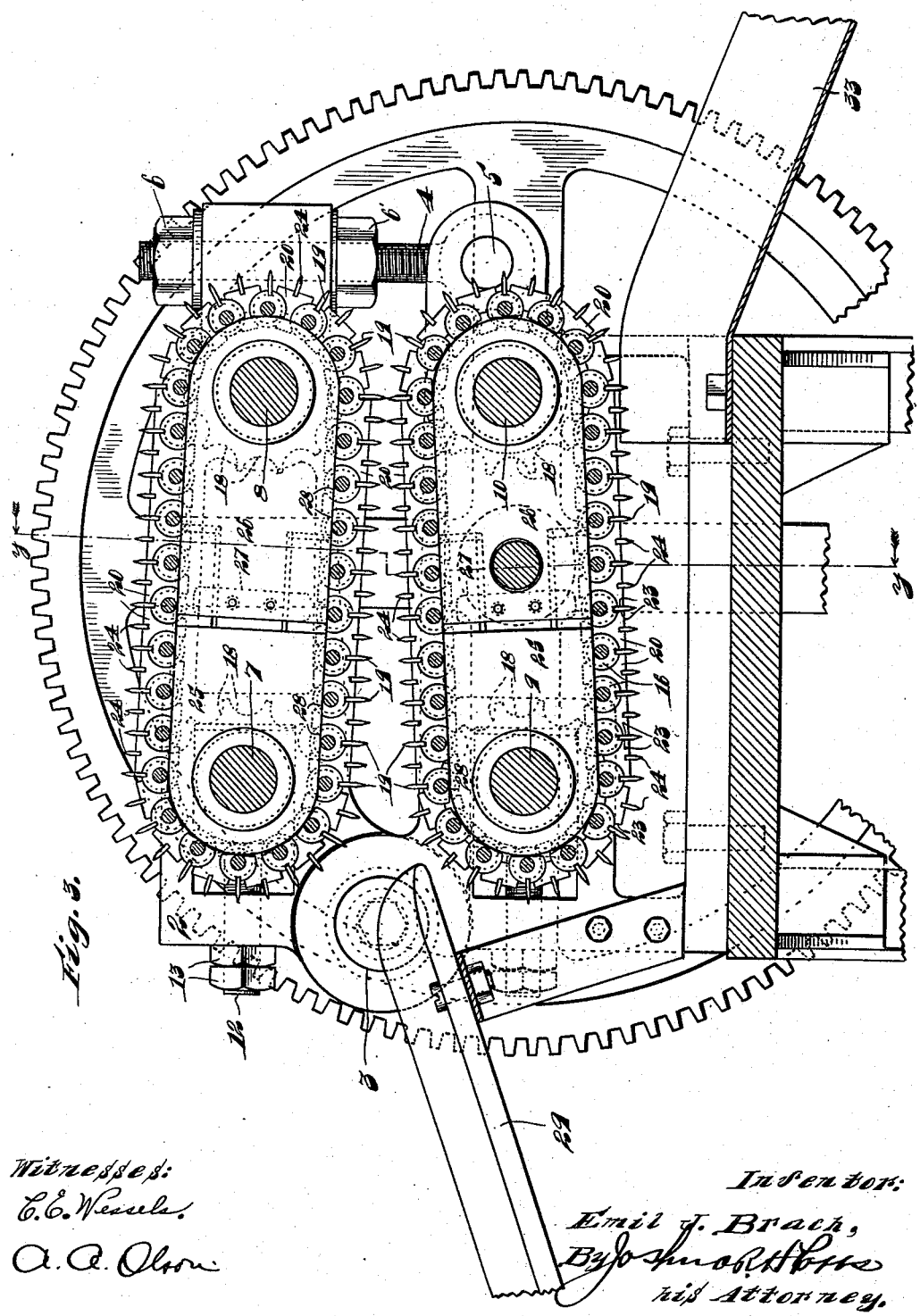
Witnesses:
E. E. Wessels
A. A. Olson
Inventor:
Emil J. Brach,
By John R. Hotts
his Attorney.

E. J. BRACH.
CONFECTIONERY MACHINE.
APPLICATION FILED JAN. 18, 1916.
1,216,936.
Patented Feb. 20, 1917.
4 SHEETS—SHEET 4.
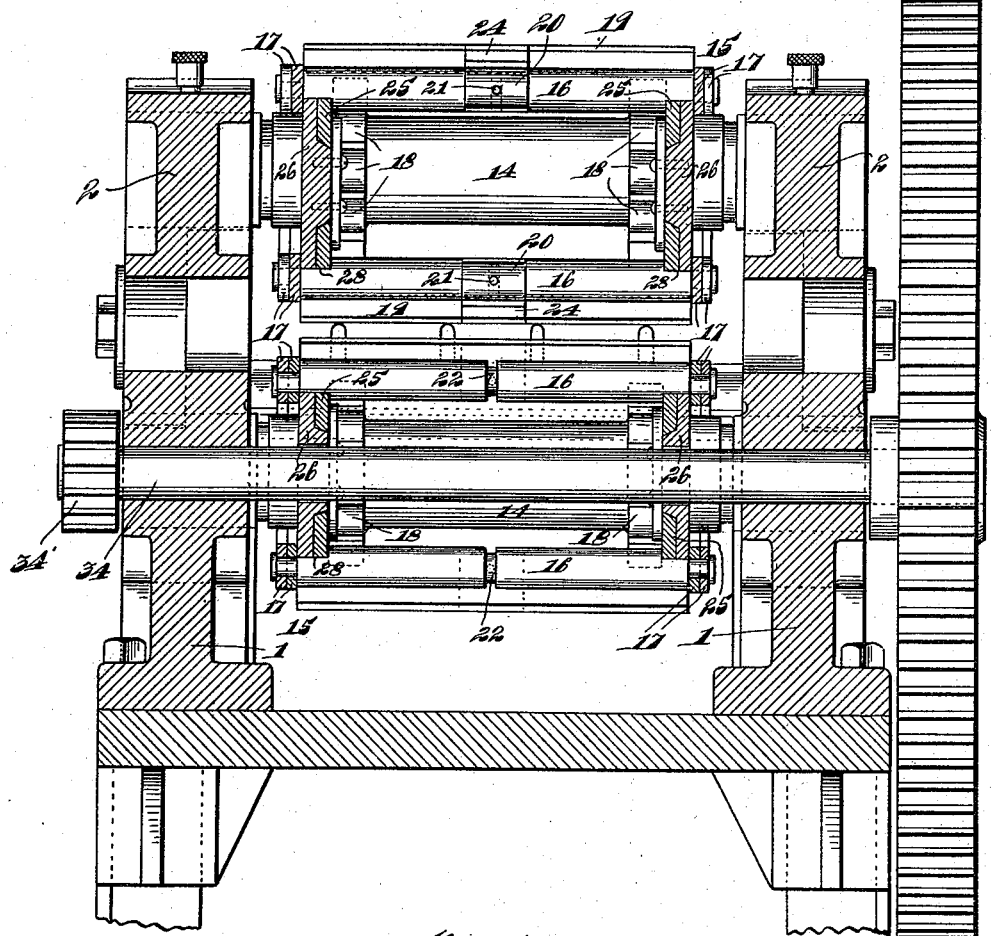

UNITED STATES PATENT OFFICE.

EMIL J. BRACH, OF CHICAGO, ILLINOIS.

CONFECTIONERY-MACHINE.

1,216,936.   Specification of Letters Patent.   Patented Feb. 20, 1917.

Application filed January 18, 1916. Serial No. 72,698.

*To all whom it may concern:*

Be it known that I, EMIL J. BRACH, a citizen of the United States, and a resident of the city of Chicago, county of Cook, and State of Illinois, have invented certain new and useful Improvements in Confectionery-Machines, of which the following is a specification.

My invention relates to confectionery machines, and more specifically to that class thereof designed for use in cutting a strip of candy or other similar plastic material into small pieces of uniform size, the present construction being designed specifically for effecting the formation of what are known as "pillows." The construction of this application is an improvement on the machine disclosed in my Patent No. 1,093,380, dated April 14, 1914 for confectionery machines.

The improvement resides particularly in the means for holding the cutter blades against relative rotary movement, and the mounting of the flexible cutter-blade elements so as to permit of ready adjustment of said elements toward and from each other and so as to permit of ready access being gained to the interior of the machine; improvement also residing in the arrangement of the cutter-blades whereby different sizes of candy may be cut on the machine.

The object of this invention is the production of a machine of the character mentioned which will be of improved construction and efficient in use.

Other objects will appear hereinafter.

The invention consists in the combinations and arrangements of parts hereinafter described and claimed.

The invention will be best understood by reference to the accompanying drawings forming a part of this specification, and in which, Figure 1 is a side elevation of a confectionery machine embodying the invention, Fig. 2 is a top plan view thereof, Fig. 3 is a vertical longitudinal section taken on substantially line *x—x* of Fig. 2, Fig. 4 is a vertical transverse section taken on substantially line *y—y* of Fig. 3, Fig. 5 is a partially sectional plan view of one of the guides included in the construction, and Fig. 6 is a detail central section through two adjacent parallel blade carrying members of the device, showing the connection therewith of the block which is arranged between the same.

The preferred form of construction, as illustrated in the drawings, comprises a supporting frame consisting of two spaced vertical stationary members 1 and two movable members 2 which are arranged directly over the members 1 and pivotally connected therewith at one end of the machine as at 3. The opposite or free ends of frame members 2 are adjustably connected with the frame members 1 by means of screws 4 which are pivotally connected at their lower ends as at 5 with the members 1, the upper ends of said screws engaging in the bifurcated ends of members 2 and being adjustably connected therewith by means of nuts 6 and 6', as clearly illustrated in Figs. 1 and 2. With this arrangement, it will be seen that vertical adjustment of the free ends of frame members 2 may be effected by manipulation of nuts 6 and 6', release of said frame members, in order to permit of upward swinging of the same being permitted upon release of bolts 4 and outward swinging of the same, as will be readily understood.

Extending between the frame members 1 and 2 and having their extremities journaled in bearings provided therein, are shafts 7, 8, 9 and 10. The shafts 7 and 9, for reasons which will appear as the description proceeds, are mounted for longitudinal adjustment in the supporting frame members, the bearing blocks 10 of said shafts being slidably mounted in elongated slots 11 provided in the frame members 1 and 2, as clearly shown in Fig. 1. The bearing blocks 10 are connected with the inner ends of screws 12 which pass loosely through the end walls of slots 11, nuts 13 threaded upon said screws affording means, as will be understood, for adjusting the positions of bearing blocks 10 in slots 11.

Fixed upon each of the shafts 7, 8, 9 and 10 is a roller 14, the central portion of the periphery thereof being cut away for lightness. Mounted upon the rollers 14 for rotation about shafts 7 and 8, and 9 and 10 respectively, are endless flexible elements 15. Each of the elements 15 consists of a series of transversely extending parallel cylindrical members 16 which are spaced apart slightly and which are connected at their extremities by endless chains 17, the periphery of rollers 14 being circumferentially recessed, as at 18, in order to accommodate the members 16. Carried by each of the members 16 is an outwardly projecting longitudinally extending blade or cutting element 19, said members 16 being longitudinally grooved for the reception of said blades. The blades of one of said flexible elements 15 are adapted to register with those of the other of said flexible elements, as clearly shown in Fig. 3, the adjacent sides of said flexible elements being inclined to each other at an acute angle so that, when said elements are synchronously moved, the blades thereof will gradually approach each other, the same being farther apart at the left hand end of the machine, and approaching each other gradually in their movement toward the opposite end of the machine where said blades are finally brought into contact with each other to effect complete severing of the material which may be passed through the machine.

Interposed between the blade carriers 16 are centrally positioned blocks 20, the opposite sides of said blocks being concave or recessed in order to engage with said carriers, as clearly shown in Fig. 6, whereby said blocks are locked in position between said carriers. In order to prevent relative longitudinal movement of the blocks, each of the same is provided with a transversely extending pin 21 having protruding ends which engage with circumferential grooves 22 formed in the members 16. The blocks 20 are so arranged and proportioned that in the passage of the blade carriers between the rollers 14, the surfaces 23 of said blocks will engage against the adjacent sides of the corresponding blades 19, as clearly shown in Fig. 6 and thus serve to lock said blades against relative rotary movement. Said blocks serve also the function of blade carriers, being grooved at their outer sides for the reception of supplemental cutter blades 24.

In the passage of bars 16 around the rollers 14, the blocks 20 move from engagement with the blades 19, in which event said blocks do not serve as means of locking said bars 16 against relative rotary movement. The cutter blades are therefore further held against relative rotary movement by means of guide members mounted upon the shafts 7, 8, 9 and 10, each of said guide elements comprising two plates 25 and 26 the adjacent ends of which are overlapped and loosely dovetailed together, as clearly shown in Figs. 4 and 5. A strap 27 secured to plate 26 engages against the corresponding side of the corresponding plate 25 in order to hold said plates in alinement, permitting, however, of free relative longitudinal movement of the same. The outer ends of the plates 25 are formed with circular openings for the passage of the shafts 7, 8, 9 and 10 therethrough, as clearly shown in Fig. 3. The blade carriers 16 are formed at their ends with flat surfaces 28 which are adapted to engage with the peripheral edges of the guide members 25—26, the latter thus serving as additional means of holding the cutter blades against relative rotation in the operation of the machine and particularly in the passage of said blades around rollers 14, the ends of guide members 25 and 26 being rounded to permit of sliding engagement therewith of the flat surfaces 28 in the movement of member 16 around rollers 14.

In the operation of the machine the strips of candy to be cut are fed to the machine over a guide member 29 which is formed at its upper side with channels 30, 31 and 32. Alternate cutter blades 19 are shorter than the others so that a strip of candy introduced to the machine through groove 30 will be cut up into pieces of a large size, the blades being spaced apart a considerable distance, as will be seen. If it is desired to cut the candy into smaller pieces, the groove 31 is used the latter introducing the strip of candy at the opposite side of the machine where the cutter blades 19 are closer together, as clearly shown in Fig. 2. If still smaller pieces are desired, the strip of candy is introduced into the machine from groove 32, in which event the same will pass between blades 19 and 24, the latter being positioned medially between the blades 19, in which case it will be seen that very small pieces will be formed. Thus, it will be seen that with the arrangement set forth, three different sizes may be cut and all at the same time if desired. A chute 33 is provided at the outlet end of the machine into which the pieces drop after being severed by the cutter blades, as will be readily understood. Driving of the endless blade carrying elements is effected by means of a shaft 34 which is mounted in the frame members 1. Said shaft is provided at one end with a pinion 34' which meshes with a gear 35 provided upon the shaft 10, said gears in turn meshing with a gear 36 which is fixed to the shaft 8, as clearly shown in Fig. 1.

The sliding adjustment afforded shafts 7 and 9 permits of any slack being taken up in the chains 17, and the slidable connection between the plates or guide sections 25 and 26 permits of the plates 25 moving in unison with said shafts in the adjustment of the same. The overlapping connection of the plates 25 and 26 insures a continuous edge for engagement with the surfaces 28 at all times. The swinging connection of the frame members 2 with the frame members 1 affords means of readily gaining access to the interior of the machine in case repair or adjustment is desired. The vertical adjustment afforded frame members 2 by manipulation of nuts 6 and 6' is utilized in securing just the proper vertical relation of the cutter blades of the upper and lower endless elements of the machine.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A machine of the class described comprising a supporting frame; rollers journaled in said frame and adjustable toward and from each other; two endless flexible elements mounted on said rollers each comprising two spaced endless chains and a plurality of parallel members extending between and connecting said chains, each parallel member being provided with a flat surface at each end thereof; longitudinally adjustable guides connected with said rollers and movable therewith in the adjustment of said rollers toward and from each other, said flat surfaces of said parallel members engaging against said guides; and cutter blades carried by said parallel members, substantially as described.

2. A machine of the class described comprising a supporting frame; rollers journaled in said frame and adjustable toward and from each other; two endless flexible elements mounted on said rollers each comprising two spaced endless chains and a plurality of parallel members extending between and connecting said chains, each parallel member being provided with a flat surface at each end thereof; sectional longitudinally adjustable guides connected with said rollers and movable therewith in the adjustment of said rollers toward and from each other, said flat surfaces of said parallel members engaging with said guides; and cutter blades carried by said parallel members, substantially as described.

3. A machine of the class described comprising a supporting frame; rollers journaled in said frame and adjustable toward and from each other; two endless flexible elements mounted on said rollers each comprising two spaced endless chains and a plurality of parallel members extending between and connecting said chains, each parallel member being provided with a flat surface at each end thereof; longitudinally adjustable guides connected with said rollers and movable therewith in the adjustment of said rollers toward and from each other, each of said guides comprising a plurality of overlapping loosely connected sections, said flat surfaces of said parallel members engaging with said guides; and cutter blades carried by said parallel members, substantially as described.

4. A machine of the class described comprising a supporting frame; rollers journaled in said frame and adjustable toward and from each other; two endless flexible elements mounted on said rollers each comprising two spaced endless chains and a plurality of parallel members extending between and connecting said chains, each parallel member being provided with a flat surface at each end thereof; longitudinally adjustable guides connected with said rollers and movable therewith in the adjustment of said rollers toward and from each other, each of said guides comprising a plurality of sections having adjacent ends in loosely overlapped dovetailed connection, said flat surfaces of said parallel members engaging against said guides; and cutter blades carried by said parallel members, substantially as described.

5. A machine of the class described comprising a supporting frame; rollers journaled in said frame; two endless flexible elements mounted on said rollers each comprising two spaced endless chains and a plurality of parallel members extending between and connected to said chains; cutter blades carried by and projecting from said parallel members; and means adapted for engagement with said blades for preventing relative rotary movement of said parallel members, substantially as described.

6. A machine of the class described comprising two superposed endless flexible elements each comprising a series of transversely extending parallel members loosely connected together at their extremities; outwardly projecting cutter blades carried by said parallel members, the cutter blades of one of said flexible elements being adapted to register with those of the other; and means interposed between said parallel members and adapted for engagement with said blades for preventing relative rotary movement of said members, substantially as described.

7. A machine of the class described comprising two superposed endless flexible elements each comprising a series of transversely extending parallel members loosely connected together at their extremities; outwardly projecting cutter blades carried by said parallel members, the cutter blades of one of said flexible elements being adapted to register with those of the other; and blocks interposed between said parallel members and adapted for engagement with said blades for preventing relative rotary movement of said members, substantially as described.

8. A machine of the class described comprising two superposed endless flexible elements each comprising a series of transversely extending parallel members loosely connected together at their extremities; outwardly projecting cutter blades carried by said parallel members, the cutter blades of one of said flexible elements being adapted to register with those of the other; and blocks interposed between said parallel members and adapted for engagement with said blades for preventing relative rotary movement of said members, said blocks having concave opposite sides to embrace said parallel members, substantially as described.

9. A machine of the class described comprising two superposed endless flexible elements each comprising a series of transversely extending parallel members loosely connected together at their extremities; outwardly projecting cutter blades carried by said parallel members, the cutter blades of one of said flexible elements being adapted to register with those of the other; blocks interposed loosely between said parallel members adapted for engagement with said blades for preventing relative rotary movement of said members; and projections on said blocks engaging grooves in said members for locking said blocks against relative longitudinal movement, substantially as described.

10. A machine of the class described comprising two superposed endless flexible elements each comprising a series of transversely extending parallel members loosely connected together at their extremities; outwardly projecting cutter blades carried by said parallel members, the cutter blades of one of said flexible elements being adapted to register with those of the other; blocks interposed loosely between said parallel members adapted for engagement with said blades for preventing relative rotary movement of said members; and projections on said blocks engaging loosely circumferential grooves in said members for locking said blocks against relative longitudinal movement, substantially as described.

11. A machine of the class described comprising two superposed endless flexible elements each comprising a series of transversely extending parallel members loosely connected together at their extremities; outwardly projecting cutter blades carried by said parallel members, the cutter blades of one of said flexible elements being adapted to register with those of the other; blocks interposed between said parallel members and movable in unison therewith; and cutter blades carried by said blocks, substantially as described.

12. A machine of the class described comprising two superposed endless flexible elements each comprising a series of transversely extending parallel members loosely connected together at their extremities; outwardly projecting cutter blades carried by said parallel members, the cutter blades of one of said flexible elements being adapted to register with those of the other; blocks interposed between said parallel members and movable in unison therewith, said blocks having grooves in their outer sides; and cutter blades mounted in said grooves, substantially as described.

13. A machine of the class described comprising two superposed endless flexible elements each comprising a series of transversely extending parallel members loosely connected together at their extremities; outwardly projecting cutter blades carried by said parallel members, the cutter blades of one of said flexible elements being adapted to register with those of the other; blocks interposed between said parallel members and adapted for engagement with said blades for preventing relative rotary movement of said members; and cutter blades carried by said blocks, substantially as described.

14. A machine of the class described comprising two superposed endless flexible elements each comprising a series of transversely extending parallel members loosely connected together at their extremities; and variously spaced cutter blades carried by and projecting from said parallel members, substantially as described.

15. A machine of the class described comprising two superposed endless flexible elements each comprising a series of transversely extending parallel members loosely connected together at their extremities; and cutter blades carried by and projecting from said parallel members, said blades along different planes running longitudinally of said flexible elements, being variously spaced, substantially as described.

In testimony whereof I have signed my name to this specification in the presence of two subscribing witnesses.

EMIL J. BRACH.

Witnesses:
JOSHUA R. H. POTTS,
HELEN F. LILLIS.

Copies of this patent may be obtained for five cents each, by addressing the "Commissioner of Patents, Washington, D. C."